INVENTORS
RICHARD L. EVERY
PAUL F. COX

RICHARD L. EVERY
PAUL F. COX
INVENTORS.

BY Robert B Coleman

ATTORNEY

United States Patent Office 3,529,951
Patented Sept. 22, 1970

3,529,951
METHOD FOR PREPARING LOW PRESSURE SULFUR-NITROGEN FERTILIZER SOLUTIONS
Richard L. Every, Ponca City, Okla., and Paul F. Cox, Richardson, Tex., assignors to Continental Oil Company, Ponca City, Okla., a corporation of Delaware
Continuation-in-part of abandoned application Ser. No. 677,840, Oct. 18, 1967, which is a continuation-in-part of abandoned application Ser. No. 493,460, Oct. 6, 1965. This application Jan. 10, 1969, Ser. No. 804,340
Int. Cl. C05c 9/00
U.S. Cl. 71—28       8 Claims

ABSTRACT OF THE DISCLOSURE

A high nitrogen content sulfur-containing liquid fertilizer of low vapor pressure and low salting out temperature can be prepared by adding sulfur, either as elemental sulfur or a sulfide, to an ammonia or ammonia salt aqueous solution and subsequently adjusting the nitrogen content by use of urea. The vapor pressure and salting out temperature is controlled by selecting the ratio of urea to ammonia in a predetermined manner.

---

This is a continuation-in-part of our application Ser. No. 677,840, filed Oct. 18, 1967 which was in turn a continuation-in-part of our application Ser. No. 493,460, filed Oct. 6, 1965, both now abandoned.

It has been known for some time that sulfur is soluble in liquid ammonia. In recent years, it has been found that sulfur is a desirable constituent in plant foods. While it has long been recognized that nitrogen, phosphorus and potassium are required in plant foods, in many areas only nitrogen need be supplied, since the soil will not be deficient in the other two ingredients. Thus, liquid ammonia or high nitrogen plant foods are frequently employed. The need for sulfur has only recently been recognized as a desirable component of such foods. This has prompted those in the fertilizer business to use ammonia-sulfur solutions as a high nitrogen liquid plant food.

In our copending application filed Oct. 22, 1965, having Ser. No. 500,581, now abandoned, it is disclosed that $H_2S$ greatly increases the rate of sulfur solubility in ammonia and that the resulting solution would be useful as a liquid fertilizer.

In our parent case, we disclosed that a low vapor pressure sulfur-nitrogen liquid fertilizer could be prepared by addition of urea to an aqueous solution of ammonia or an ammonia salt and by addition of sulfur or a sulfide. With such solutions one could select a desired nitrogen and sulfur content. Although we stated in our parent case that we wanted a liquid fertilizer and referred to the prior art patent U.S. 3,234,004 of Smith et al., which showed that high nitrogen fertilizer tended to salt out, we inadvertently failed to show the salting out temperatures of fertilizers.

In sulfur-ammonia solutions, the vapor pressure which one would expect under normal application conditions will generally be in the range of 100 to 250 p.s.i.g. (e.g. 110 p.s.i.g. at 25° C.). While these pressures are not excessive, there are circumstances where a lower vapor pressure is desirable both from the safety standpoint as well as ease of operations. Such lower vapor pressures would also reduce the loss of ammonia by evaporation. While it is recognized that a low vapor pressure liquid fertilizer is desirable, it has been believed that, when the nitrogen content exceeds about 20 percent in aqueous solutions of ammonia salts, a salting out occurs, see for example U.S. Pat. 3,234,004. It has also been believed that, when sulfur solutions in ammonia are diluted with water, you get a sulfur suspension, see U.S. 3,006,755. We have found that you can prepare a high nitrogen, e.g., 25 to 50 percent nitrogen (preferably 30 to 50 percent nitrogen), liquid fertilizer by this method.

It is an object of this invention to provide a low vapor pressure, liquid sulfur-nitrogen fertilizer which has a low salting out temperature and method for preparing same.

According to this invention, sulfur is added to a low vapor pressure liquid nitrogen fertilizer containing ammonia or an ammonium salt, and the total nitrogen content is controlled by addition of urea while the sulfur content is controlled by addition of sulfur or sulfide. In one embodiment, sour (sulfur-containing) natural gas is utilized as the source of sulfur. These fertilizers have a salting out temperature lower than that of the prior art and is controlled by selecting the urea-ammonia ratio.

If one wishes to ship or use a liquid fertilizer, it must not salt out at temperatures which it may be subjected to during the shipping, storing or application period. Since the prime fertilizing season is in the spring and the high nitrogen fertilizers of the prior art tend to salt out in the absence of an added ingredient at about 64° F., it is desirable to prepare such fertilizers which salt out at a considerably lower temperature, e.g. 30 to 50° F. depending upon the area of the country.

In further describing this invention, reference will be made to the figures of which:

Figure 1:
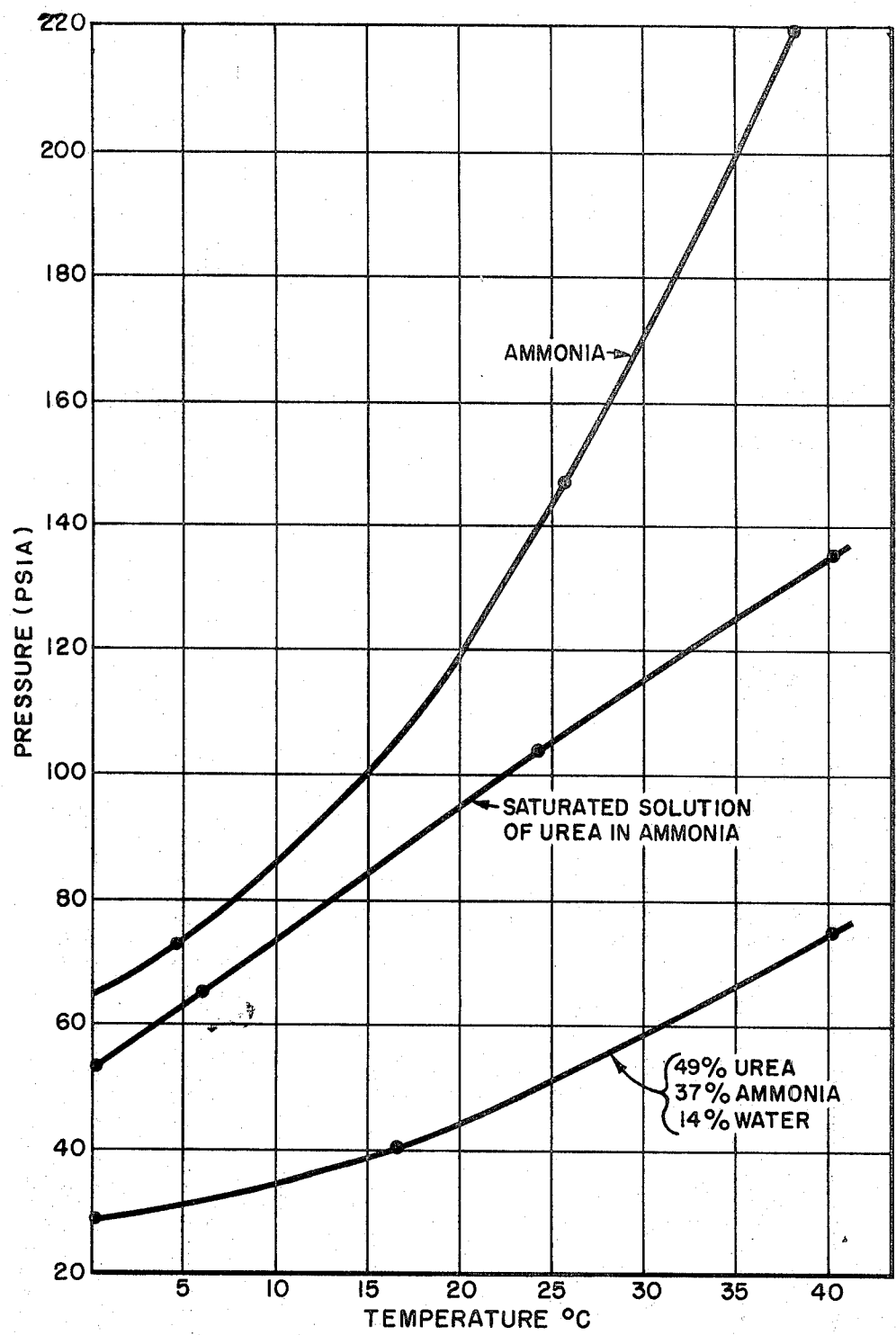
FIG. 1 is a plot of vapor pressure versus temperature for ammonia, ammonia saturated with urea and a typical ammonia, urea, water, liquid fertilizer.

As has been indicated, it is known that urea in ammonia will reduce the vapor pressure, and such solutions in water will further lower the vapor pressure. This is clearly shown in FIG. 1. It is well known that greater percentages of water will lower the vapor pressure even more, but since water dilutes the total nitrogen content, the water is kept to a minimum.

A typical liquid fertilizer containing 32 percent nitrogen would be 44.3 percent $NH_4NO_3$, 35.4 percent urea, and 20.3 percent $H_2O$, all percents are weight percents through this specification and the claims. Now, if we wished to provide a 32 percent nitrogen fertilizer with sulfur, the amount of sulfur can be controlled by adding sulfur to $(NH_4)_2S$ to form the polysulfide and the $(NH_4)_2S$ incorporated into the blend. The nitrogen content would then be controlled by varying the ratio of $NH_4NO_3$ and urea. For example, if one desires to provide a liquid fertilizer with 32 percent nitrogen as above with varying amounts of sulfur, the $NH_4NO_3$ and urea would be adjusted while adding a predetermined amount of $(NH_4)_2S$ with or without additional sulfur. The runs as shown in Table I illustrate this approach.

TABLE I

|  | Run | | |
|---|---|---|---|
|  | 1 | 2 | 3 |
| Sulfur, grams | 0 | 0 | 5.75 |
| $NH_4NO_3$, grams | 44.3 | 37.3 | 37.3 |
| Urea, grams | 33.2 | 35.4 | 47.6 |
| $(NH_4)_2S$ (22% aqueous solution), grams | 27.3 | 27.3 | 27.3 |
| P.s.i.g. | 0 | 0 | 0 |
| Nitrogen, wt. percent | 32.0 | 32.1 | 32.0 |
| Sulfur, wt. percent | 2.75 | 2.9 | 7.3 |

Solutions from 1 and 2 were clear yellow liquids while solution 3 was a clear red liquid. The vapor pressure of these solutions was less than atmospheric; however, they all had a slight sulfide smell.

From the above table, it can be seen that nitrogen content can readily be controlled by varying the ammonium nitrate and urea ratios. From runs 1 and 2 only these ratios were varied. It would be obvious that higher or lower nitrogen contents could be obtained by changing these ratios in a manner which would not offset one against the other—for example, by holding the $NH_4NO_3$ weight the same and increasing the weight of urea. The sulfur content would then be lower, but as shown in run 3 this could be corrected by addition of sulfur flowers.

In another run, we prepared a liquid fertilizer by mixing 80 grams $NH_4OH$ (20% $NH_3$ content), 78.3 grams urea, 15 grams of 20% $(NH_4)_2S$ aqueous solution and 6 grams of sulfur. This gave a clear red solution again containing 32 percent nitrogen and 4.2 percent sulfur. The vapor pressure was nil, and there was no sulfide odor detected. However, as would be expected from the use of $NH_4OH$, there was an ammonia odor. This odor was not considered objectionable particularly since the users of liquid ammonia are used to this odor.

Another method of preparing an ammonia and sulfur liquid fertilizer with some reduction in pressure would be to add sulfur to an urea-ammonia mixture. For example, from FIG. 1, at 26° C. the vapor pressure of ammonia is 148 p.s.i.a. and that of ammonia saturated with urea is 106 p.s.i.a. At 38° C. the vapor pressure of ammonia is 220 p.s.i.a. and that of the saturated urea in ammonia is 134 p.s.i.a. Sulfur can be added to this system either in the form of $H_2S$ or pure sulfur up to the maximum solubility, i.e., about 22 percent at 26° C. and about 18 percent at 38° C.

Still another method would be to use an urea-ammonia-water system. For example, in FIG. 1, a solution of 49 percent urea, 37 percent ammonia and 14 percent water has a vapor pressure of only 48 p.s.i.a. at 23° C. as compared to 133 p.s.i.a. of the pure liquid ammonia at this temperature. Three clear, dark red solutions of the approximate concentration given above were made as shown in Table II.

TABLE II

|  | Run | | |
|---|---|---|---|
|  | 4 | 5 | 6 |
| Sulfur, grams | 6 | 8 | 8 |
| $NH_3$, grams | 60 | 60 | 60.5 |
| Urea, grams | 98 | 98 | 98 |
| $H_2O$, grams | 0 | 13.4 | 13.4 |
| $(NH_4)_2S$ (20% aqueous solution), grams | 36 | 18.8 | 18.8 |
| 23° C., p.s.i.a | 35 | 35 | 35 |
| Nitrogen, wt. percent | 49.3 | 48.9 | 49.4 |
| Sulfur, wt. percent | 4.9 | 5.0 | 5.0 |

The sulfur in Table II was added as "flowers of sulfur," however, it should be understood that it could have been added as $H_2S$ or any other form of soluble sulfur.

As has been indicated, the ammonia can be ammonia or an ammonium salt. However, the industry generally prefers ammonia, ammonium nitrate, ammonium sulfate or ammonium thiosulfate.

Figure 3:
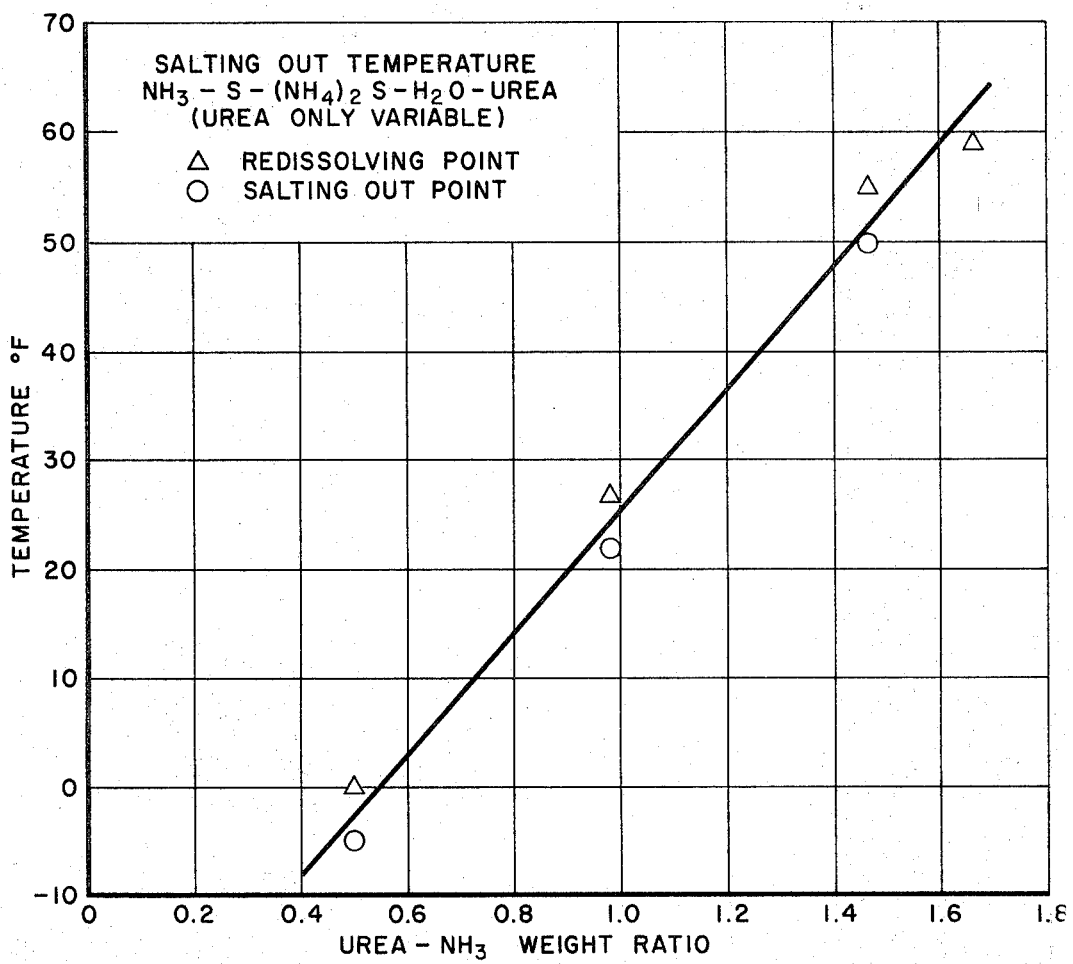
FIG. 3 is a plot of salting out temperatures vs. urea—$NH_3$ ratio.

Four compositions were prepared keeping everything essentially the same except for the urea-nitrogen ratio. These runs illustrate the effect the urea-nitrogen ratio has on salting out temperatures. These compositions and results are summarized in Table III and the urea-nitrogen ratio vs. salting out temperature is plotted in FIG. 3.

TABLE III

|  | Run | | | |
|---|---|---|---|---|
|  | 7 | 8 | 9 | 10 |
| Sulfur, grams | 8.0 | 8.0 | 8.0 | 8.0 |
| $NH_3$, grams | 60 | 60 | 60 | 60 |
| Urea, grams | 98 | 88 | 30 | 59 |
| $H_2O$, grams | 13.4 | 13.4 | 13.4 | 13.4 |
| $(NH_4)_2S$ (20% aqueous solution) grams | 18.8 | 18.8 | 18.8 | 18.8 |
| Nitrogen, wt. percent | 48.8 | 49.3 | 49.9 | 52.6 |
| Sulfur, wt. percent | 5.0 | 5.2 | 7.5 | 10.6 |
| Urea: $NH_3$, wt. ratio | 1.63:1 | 1.47:1 | 0.5:1 | 1:1 |
| Salting out temp., ° F | 54 | 50 | −5 | 22 |
| Redissolving temp., ° F | 59 | 55 | 0 | 27 |

From Table III, it can be seen that as the urea ammonia ratio increases, the salting out temperature increases. Therefore, we prefer that the urea-ammonia ratio be below about 1.5 to 1. As can be seen from FIG. 1, water in the fertilizer solution permits a relatively high ammonia content, e.g. low urea to ammonia ratio, without excessive vapor pressure. We would also prefer to have at least 10% water present. The desired nitrogen content will determine the minimum urea-ammonia ratio and maximum water content. Generally we would use a water content of 10 to 20% and a urea-nitrogen ratio in the range 0.5:1 to 1.5:1.

Figure 2:
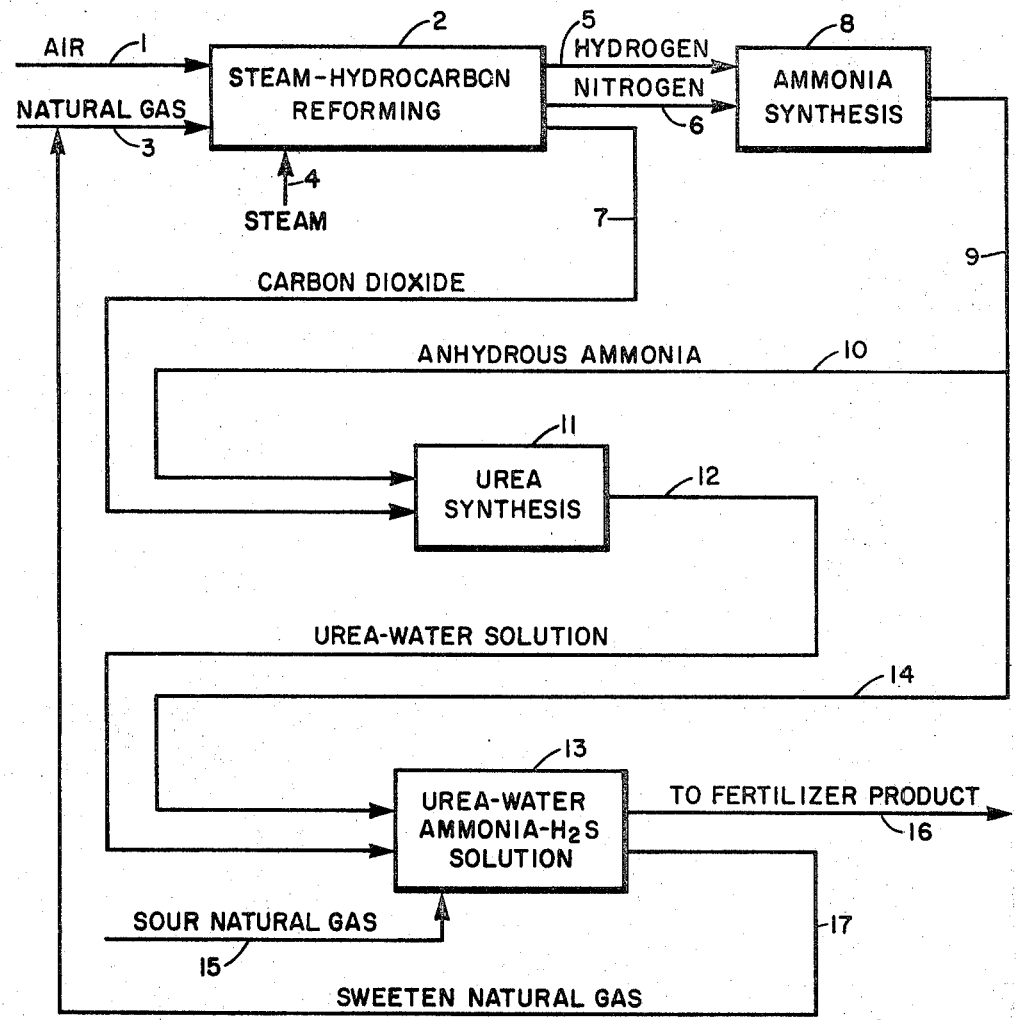
FIG. 2 is a schematic diagrammatic flow scheme for preparing a liquid fertilizer of this invention utilizing sour natural gas as the raw material.

Referring now to FIG. 2, a solution with a concentration approximately those given in Table II could be prepared as shown.

Air is passed via conduit 1 to steam-hydrocarbon reforming zone 2. Natural gas is passed to zone 2 via conduit 3 and steam via conduit 4. The air, steam and gas react to form hydrogen, nitrogen and $CO_2$. Sufficient air is utilized to provide the desired ratio of nitrogen to hydrogen for ammonia synthesis. The hydrogen is passed via conduit 5 and the nitrogen via conduit 6 to ammonia syntheses zone 8. The resulting $CO_2$ is removed via conduit 7 and passed to urea synthesis zone 11. Ammonia from zone 8 is removed via conduit 9. Sufficient ammonia is passed via conduit 10 to zone 11 to react with $CO_2$ to form urea and water. The effluent from zone 11 passes via conduit 12 to reaction zone 13, and the excess anhydrous ammonia from zone 8 is passed via conduit 14 to zone 13. Sour natural gas is bubbled into this zone where the sulfur, probably as $H_2S$, is absorbed in the solution and the sweetened natural gas is removed via conduit 17 and passed back to conduit 3 where additional natural gas is added as required. The product from zone 13 is removed via conduit 16.

It should be noted that the urea-water effluent from zone 11 is in stoichiometric ratio for the reaction in zone 13, thus no separation problem is involved, nor is additional water required.

It is obvious that the sweetened gas can be sent directly to product gas line if desired. It is also within the scope of the invention to add additional sulfur to zone 13 if desired. Other modifications will be readily apparent to those skilled in the art. Pumps, reaction conditions, valves and the like are omitted, since all of these are well known reactions and can readily be supplied by the art.

We claim:

1. A method for preparing a liquid solution fertilizer of low vapor pressure and low salting out temperature comprising adding to an aqueous solution of ammonia or a soluble ammonia salt, sulfur or flowers of sulfur or a water-soluble sulfide, and thereafter adjusting the nitrogen content of the resulting solution to a range between 25 and 50 weight percent by the addition of urea so that the resulting solution contains 10 to 20 weight percent water and the urea-ammonia ratio is in the range 0.5:1 to 1.5 to 1.

2. The method of claim 1 wherein the said aqueous solution is a solution of ammonia and the sulfur is ammonium sulfide.

3. The method of claim 2 wherein additional sulfur is added as flowers of sulfur.

4. The method of claim 1 wherein the said aqueous solution is a solution of ammonium nitrate.

5. The method of claim 4 wherein the sulfur is added as hydrogen sulfide.

6. The method of claim 4 wherein the sulfur is added as ammonium sulfide.

7. The method of claim 5 wherein additional sulfur is added as flowers of sulfur.

8. The method of claim 6 wherein additional sulfur is added as flowers of sulfur.

References Cited
UNITED STATES PATENTS

| 3,079,245 | 2/1963 | Young | 71—54 |
| 3,234,004 | 2/1966 | Smith et al. | 71—28 |

J. L. DE CESARE, Primary Examiner